(12) United States Patent
Soltis, Jr.

(10) Patent No.: US 7,600,101 B2
(45) Date of Patent: Oct. 6, 2009

(54) MULTITHREADED HARDWARE SYSTEMS AND METHODS

(75) Inventor: Donald C. Soltis, Jr., Fort Collins, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 589 days.

(21) Appl. No.: 11/034,464

(22) Filed: Jan. 13, 2005

(65) Prior Publication Data
US 2006/0155973 A1 Jul. 13, 2006

(51) Int. Cl.
*G06F 9/312* (2006.01)
(52) U.S. Cl. ..................................... 712/228
(58) Field of Classification Search ................. 712/228; 714/3, 13; 717/108
See application file for complete search history.

(56) References Cited

U.S. PATENT DOCUMENTS

| | | | |
|---|---|---|---|
| 5,991,792 A * | 11/1999 | Nageswaran ................ 718/102 |
| 6,223,208 B1 | 4/2001 | Kiefer et al. |
| 6,351,808 B1 | 2/2002 | Joy et al. |
| 6,401,216 B1 * | 6/2002 | Meth et al. .................... 714/16 |
| 6,493,741 B1 | 12/2002 | Emer et al. |
| 6,578,137 B2 * | 6/2003 | Parady ....................... 712/228 |
| 6,675,192 B2 | 1/2004 | Emer et al. |
| 6,681,345 B1 | 1/2004 | Storino et al. |
| 6,687,809 B2 | 2/2004 | Chowdhury et al. |
| 6,748,556 B1 | 6/2004 | Storino et al. |
| 6,801,997 B2 | 10/2004 | Joy et al. |
| 6,938,252 B2 * | 8/2005 | Baylor et al. ................ 718/102 |
| 7,120,783 B2 * | 10/2006 | Fotland et al. .............. 712/228 |
| 7,185,185 B2 * | 2/2007 | Joy et al. ..................... 712/228 |
| 2003/0041228 A1 * | 2/2003 | Rosenbluth et al. ......... 712/220 |
| 2004/0059896 A1 * | 3/2004 | Kossman et al. ............ 712/228 |
| 2004/0139441 A1 * | 7/2004 | Kaburaki et al. ............ 718/107 |
| 2004/0243765 A1 * | 12/2004 | Lee ............................ 711/118 |

FOREIGN PATENT DOCUMENTS

| | | |
|---|---|---|
| JP | H02-148223 A | 6/1990 |
| JP | H09-016409 A | 1/1997 |
| JP | H10-083349 A | 3/1998 |
| JP | 2002-536713 A | 10/2002 |

OTHER PUBLICATIONS

Japanese Office Action dated Jan. 15, 2009 for patent application No. 2005-367546.
English Translation of Japanese Office Action dated Jan. 15, 2009 for patent application No. 2005-367546.

* cited by examiner

*Primary Examiner*—Eric Coleman (57) ABSTRACT

Multithreaded hardware systems and methods are disclosed. One embodiment of a system may comprise a multithreaded processor comprising a register file having N hardware threads, where N is an integer greater than or equal to one, and an offline storage structure having M hardware threads, where M is an integer greater than or equal to one. The multithreaded processor system may further comprise a thread control that transfers register values associated with at least one of the N hardware threads to registers of at least one of the M hardware threads and transfers register values of at least of one of the M hardware threads to registers of at least one of the N hardware threads.

27 Claims, 4 Drawing Sheets

MULTITHREADED HARDWARE SYSTEMS AND METHODS

BACKGROUND

A hardware multithreaded processor maintains the state of more than one thread in architected hardware processors within the processor core. Several threads may execute in a multithreaded processor by merely changing the architected processor state in hardware registers each associated with a unique thread. The processor may change registers on every machine cycle or the processor may switch registers, or threads, when the processor is idle because, for instance, it is waiting for data or instructions from a more distant cache or memory. In this manner, remote systems and/or software view a single processor as one or more processors based on the number of hardware threads associated with the processor.

However, the number of hardware threads is limited by die area and performance. As the number of threads increase, the circuitry associated with supporting the additional threads increases in complexity and size making additional hardware threads impractical. Furthermore, performance is decreased as the number of hardware threads increase due to a limited number of read and write ports, and the overhead required for transferring the values between processor execution units and the hardware registers.

SUMMARY

One embodiment of the present invention may comprise a multithreaded processor comprising a register file having N hardware threads, where N is an integer greater than or equal to one, and an offline storage structure having M hardware threads, where M is an integer greater than or equal to one. The multithreaded processor system may further comprise a thread control that transfers register values associated with at least one of the N hardware threads to registers of at least one of the M hardware threads and transfers register values of at least of one of the M hardware threads to registers of at least one of the N hardware threads.

Another embodiment may comprise a multithreaded register file architecture comprising a register file having at least one hardware thread and associated control logic for reading and writing of register values associated with an active hardware thread of the register file, and an offline thread structure having at least one offline hardware thread for storing register values associated with an architected state of at least one inactive hardware thread of the register file. The multithreaded register file architecture may further comprise a thread control that initiates the transfer of register values between at least one inactive thread of the register file and the at least one offline hardware thread of the offline thread structure.

Still yet another embodiment may comprise a register file system having a register file with at least one hardware thread. The system may comprise means for storing architected states of registers associated with at least one hardware thread of the register file offline from the register file and means for controlling the transfer of architected states of registers between the register file and the means for storing architected states.

Still yet a further embodiment may comprise a method for storing architected states associated with registers of a register file. The method may comprise unloading register values from a hardware thread of a register file to a hardware thread in an offline thread structure and loading register values from a hardware thread in the offline thread structure to a hardware thread of the register file.

DETAILED DESCRIPTION

This disclosure relates generally to a multithreaded hardware systems and methods. The systems and methods include a register file with one or more hardware thread and an offline storage structure that stores architected states (e.g., register values) of the one or more hardware threads in the register file. The architected states can be transferred from the register file to the offline storage structure and from the offline storage structure to the register file sequentially or concurrently. The use of the offline storage structure allows for hardware thread resource expansion without increasing the size or complexity of the register file.

Figure 1:
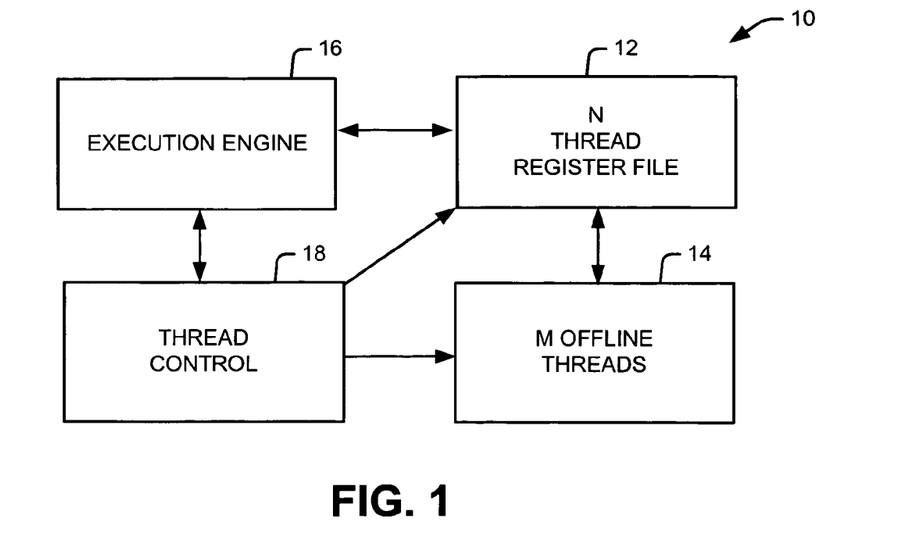
FIG. 1 illustrates a block diagram of an embodiment of a multithreaded processor system having a multithreaded hardware architecture.

FIG. 1 illustrates a multithreaded processor system 10 having a multithreaded architecture. The system 10 includes a thread register file 12 having N hardware threads, where N is an integer equal to or greater than one. Each of the N hardware threads contains a plurality of substantially identical hardware registers. For example, a given hardware thread can include 128 general registers, 128 floating registers, 8 branch registers, 15 control registers, 20-30 application registers, and a number of one or more additional register types based on a given processor architecture. The thread register file 12 also includes a plurality of read ports and associated driver circuitry for reading register values from the registers of a selected hardware thread (i.e., active thread) and a plurality of write ports and associated driver circuitry for writing register values to registers of the selected hardware thread.

The thread register file 12 also includes control logic for selecting an active thread for execution, and inactivating a currently active thread. Only one of the N hardware threads are active and employed for execution at a given time. The remaining N-1 threads remain in an inactive state, until one of the N-1 threads are selected for activation. The corresponding registers of the N hardware threads can be arranged in columns alongside one another, such that a first register of a first hardware thread is arranged alongside a substantially identical second register associated with a second hardware thread for each of the N threads. Additionally, this can be repeated for each substantially identical register of the N threads. In this manner, the logic associated with inactivating a current active hardware thread and activating a selected hardware thread can be simplified. Furthermore, the logic associated with reading and writing to registers of an active hardware thread can be simplified.

The system 10 includes an offline hardware thread structure 14 having M offline hardware threads, where M is an integer equal to or greater than one. Each of the M offline hardware threads contains a plurality of substantially identical hardware registers as each of the N hardware threads of the thread register file 12. The offline hardware thread structure 14 can be substantially smaller than the thread register file 12, since it does not require the drive circuitry and selection circuitry that the thread register file 12 employs. The corresponding registers of the M offline hardware threads of the offline hardware thread structure 14 can be arranged in columns alongside one another, such that a first register of a first hardware thread is arranged alongside a substantially identical second register associated with a second hardware thread for each of the M offline threads. Additionally, this can be repeated for each substantially identical register of the M threads. The corresponding registers of the offline hardware thread structure 14 can be arranged in the same manner as the registers of the thread register file 12, so that substantial identical registers of the offline hardware thread structure 14 and the thread register file 12 can be aligned for facilitating transfers of register values associated with different architected states between the thread register file 12 and the offline hardware thread structure 14.

The system 10 includes a thread control 18 and an execution engine 16. The execution engine 16 can include a plurality of execution units (e.g., arithmetic logic units and associated circuitry) for performing parallel operations on the data residing in registers of the active thread. The execution engine can also include instruction queues, instruction caches, storage buffers and other devices typical of a processor. The thread control 18 can be integrated as part of the execution engine 16 or be a stand-alone device. The thread control 18 controls the transfer of register values associated with an active hardware thread from the register file 12 to the execution engine 16 via the read ports and from the execution engine 16 to the register file 12 via the write ports. The thread control 18 also controls the switching of which of the N hardware threads of the register file 12 is the active thread and which of the N-1 hardware threads of the register file 12 are to be the inactive threads. The thread control 18 can receive instructions from the execution engine 16 or some other control function to switch active threads, including which of the N-1 inactive hardware threads are to be the next active thread. The thread control 18 can then inactivate the current active hardware thread, and activate the selected one of the N-1 hardware threads. This can be accomplished by generating control signals that control the switching of the hardware threads via control logic associated with the thread register file 12. The execution engine 16 can then read and write register values to the newly activated hardware thread.

The thread control 18 also controls the offloading of register values associated with architected states of one or more inactive hardware threads to the offline storage structure 14 and the loading of register values associated with architected states of one or more offline hardware threads to the thread register file 12. The thread control can receive instructions from the execution engine 16 or some other control function that indicates which of the offline hardware threads are to be selected for loading register values into which of the hardware threads of the register file, and which of the hardware threads of the register file are to be selected for offloading register values to which of the offline hardware threads of the offline storage 14. The execution engine 16, thread control 18 or other control function can determine which threads are to be selected for offloading and loading by reviewing the instructions in an instruction queue or monitoring outstanding load-miss dependencies. Alternatively, the thread switching can be scheduled by a thread scheduler, for example, associated with an operating system.

Figure 2:
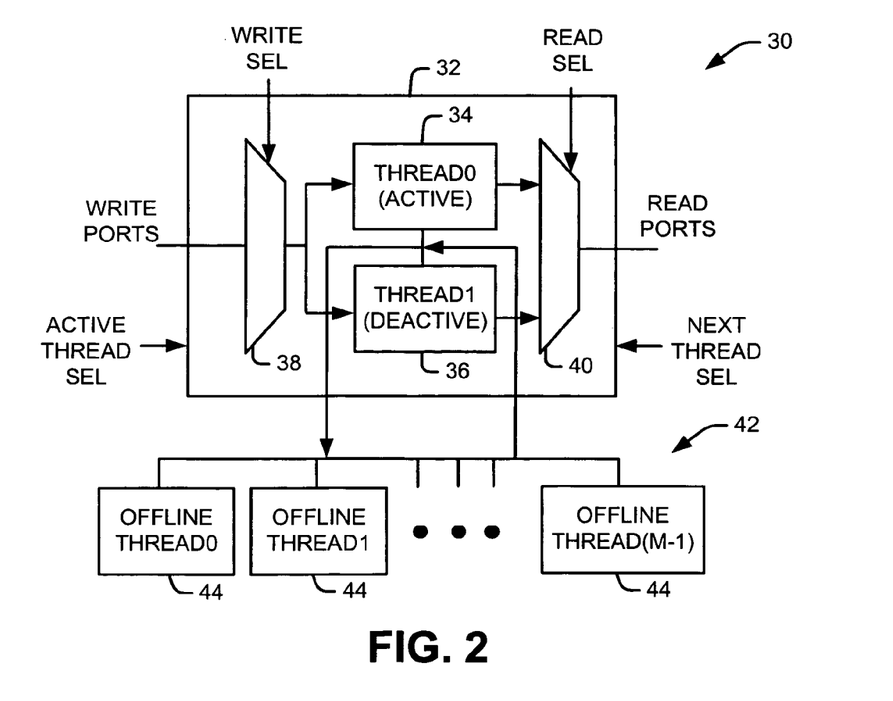
FIG. 2 illustrates a schematic block diagram of an embodiment of a multithreaded register file architecture.

FIG. 2 illustrates a multithreaded register file architecture 30. The multithreaded register file architecture 30 includes a multithreaded register file 32 and an offline hardware thread structure 42 having a plurality of offline threads 44, labeled offline thread0 through offline thread(M-1). The multithreaded register file 32 contains a first hardware thread 34 (thread0) and a second hardware thread 36 (thread1). An active thread select signal determines which of the first hardware thread 34 and the second hardware thread 36 is the active thread and which of the first hardware thread 34 and the second hardware thread 36 is the inactive thread. The multithreaded register file 32 includes an input multiplexer 38 that is coupled to a plurality of write ports for writing data from an execution engine (not shown) into registers associated with the current active thread. The multithreaded register file 32 includes an output multiplexer 40 that is coupled to a plurality of read ports for reading data from registers associated with the current active thread to an execution engine.

The multithreaded register file 32 also receives a next thread selection instruction from, for example, a thread control. The next thread selection instruction initiates the inactivating of the active thread, the activating of the inactive thread, the offloading of register values from a currently inactivated thread to a selected one of the offline threads 44, while loading register values from a selected one of the offline threads 44 to the registers of the currently inactivated thread in the multithreaded register file 32. Instructions can employ registers of the currently active thread. The currently active thread of the multithreaded register file 32 can then be inactivated, and the inactived thread of the multithreaded register file 32 can be activated. The register values from the newly inactivated thread can then be offloaded to registers of a selected one of the offline threads, while the register values of a selected offline thread can be loaded to the registers of the inactivated thread of the multithreaded register file 32. This process can repeat each time it is desired to save an architected state of a currently active thread, begin execution on an inactive thread in the multithreaded register file 32, and begin queing for execution of an architected state of register values residing in an offline thread 44. It is to be appreciated that the register values of the inactivated thread in the multithreaded register file 32 and the register values of the offline thread 44 to be loaded into multithreaded register file 32 can switch concurrently, for example, by employing shift registers. Alternatively, one of the offline threads 44 can be employed as a transition thread such that the register values of the inactivated thread of the multithreaded register file 32 can be offloaded into the transition thread, and the register values of a selected offline thread 44 can be loaded into the inactive thread of the multithreaded register file 32. This can occur either sequentially or concurrently. A variety of other techniques for offloading register values from an inactivate thread of the multithreaded register file 32 and loading register values from an offline thread structure 42 to the inactivate thread of the multithreaded register file 32 may be employed.

Figure 3:
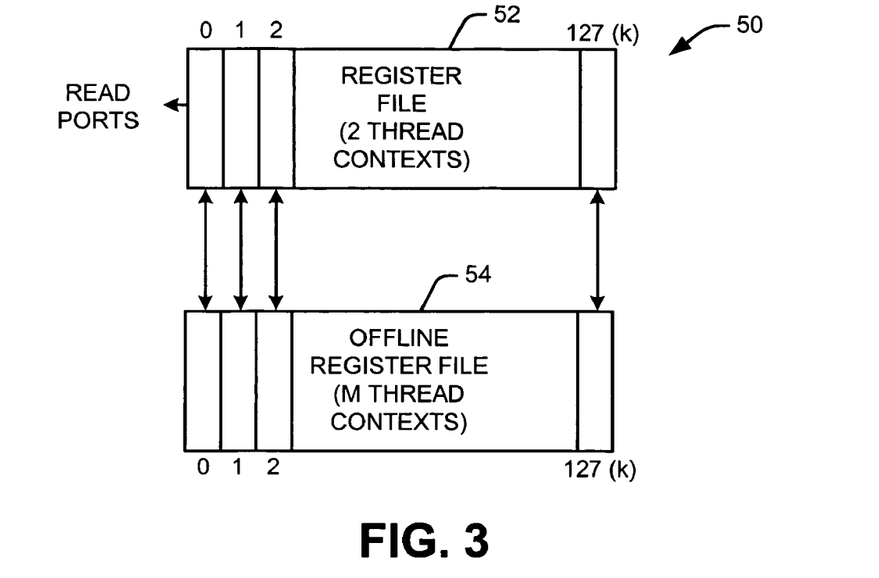
FIG. 3 illustrates a block diagram of an embodiment of a register file architecture that employs an offline register file.

FIG. 3 illustrates an exemplary register file architecture 50 that employs an offline register file. The exemplary register file architecture 50 includes a portion of a hardware register file 52 with 128 registers having a two thread context. That is each of the 128 registers, labeled register 0-127 are configured as a first register portion having k bits (e.g., 64 bits) associated with a first hardware thread, and a second register portion having k bits (e.g., 64 bits) associated with a second hardware thread. Each register has an associated first and second portion aligned along a column having a two bit width, such that 128 register pair columns form the register file 52. At any given time, a first register portion of each register pair is in an active state and a second register portion of each register pair is in an inactive state. Data from one or more register portions associated with the active thread can be read from one or more read ports, and provided to one or more execution units for execution.

The exemplary register file architecture 50 includes an offline register file 54 with 128 registers having a M thread context. Each register of the offline register file 54 has M associated register portions aligned along a column, such that 128 register columns of M bit widths form the offline register file 54. Each of the M associated register portions of each of the 128 registers, labeled register 0-127 are configured to have k bits (e.g., 64 bits). Each of the register columns of M bit widths are aligned with an associated register pair in the register file 50 to facilitate offloading of register values of an inactivated thread of the register file 50 to registers in an offline thread in the offline register file 54, and loading of register values of an offline thread in the offline register file 54 to the inactivated thread in the register file 52.

Figure 4:
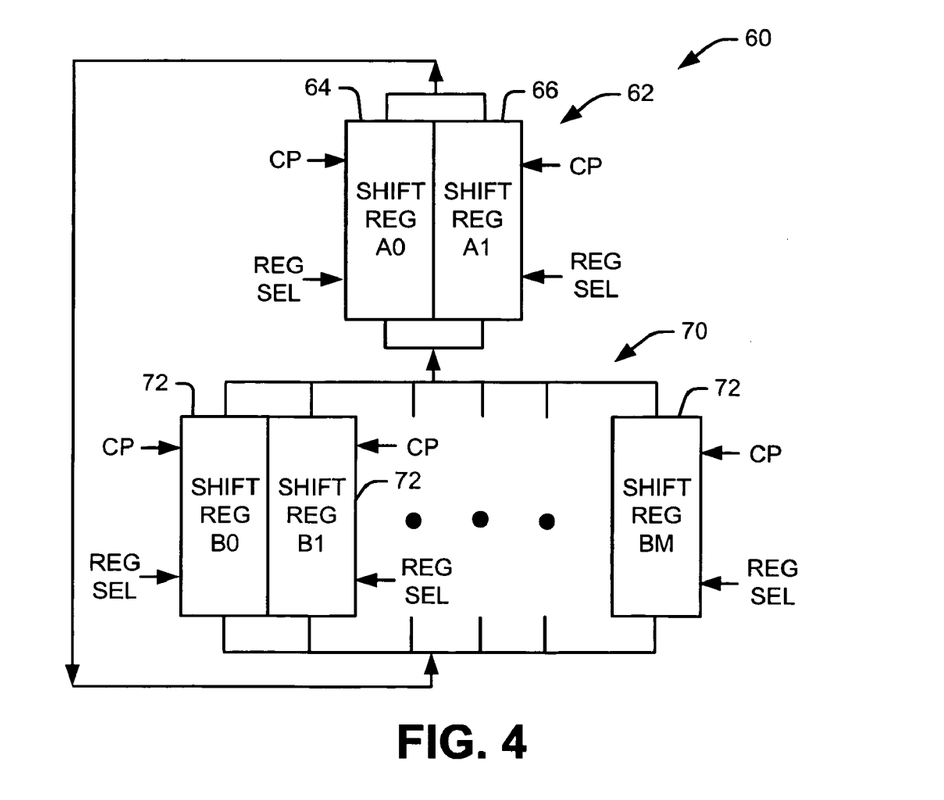
FIG. 4 illustrates a block diagram of an embodiment of a shift register ring.

FIG. 4 illustrates a shift register ring 60 for a single register 62 having a two thread context. The shift register ring 60 can be employed for loading and offloading register values for a register file architecture, such as that described in FIG. 3. The single register 62 of the register file has a first shift register portion 64 (shift register A0) disposed adjacent a second shift register portion 66 (shift register A1). The single register 62 is configured as a column (e.g., 64 bits high) that is two bits wide. One of the shift register portions is associated with an active thread and one of the shift register portions is associated with an inactive thread. The shift register ring 60 includes an M bit wide offline register 70 having M additional register portions, labeled shift register B0-BM, where M is an integer greater than or equal to one. The M additional register portions are associated with the single register of the register file and are configured as a column (e.g., 64 bits high) that is M bits wide. It is to be appreciated that the shift register ring can be repeated for each register of the register file.

The shift register ring 60 allows the transfer of register values from a selected register portion (64 or 66) of the register 62 to a selected register portion 72 of the offline register 70 concurrently with the transfer of register values from a selected register portion 72 of the offline register 70 to a selected register portion (64 or 66) of the register 62. For example, the first shift register portion 64 transitions from an active state to an inactive state, while the second shift register portion 66 transitions from an inactive state to an active state. The register values in the first register portion 64 can now be offloaded to one of the offline register portions 72. A thread controller (not shown) can generate a register select signal (REG SEL) to select the first register portion 64 for offloading, and generate a register select signal (REG SEL) for selecting an offline register portion 72 for loading contents of the offline register portion 72 to the first register portion 64, while offloading the contents of the first register portion 64 to the selected offline register portion 74. This can be accomplished by generating clock pulses (CP) that shift the contents from the first shift register portion 64 to the contents of the selected offline register portion 72, while concurrently shifting the contents of the offline register portion 72 to the first register portion 64. For example, if both the first register portion 64 and the offline register portion 74 contain 64 bits, the data can be fully shifted and transferred in 64 clock cycles.

Figure 5:
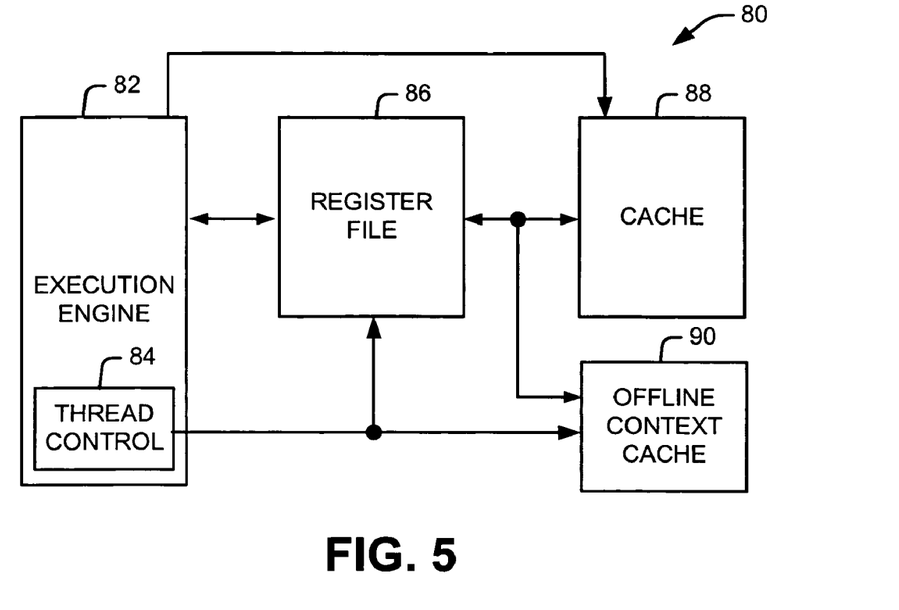
FIG. 5 illustrates a block diagram of an embodiment of multithreaded processor system with an offline context cache.

FIG. 5 illustrates a multithreaded processor system 80 with an offline context cache 90 for thread resource expansion. The system 80 includes a register file 86, a cache 88, the offline context cache 90 and an execution engine 82. The execution engine 82 includes a thread control 84 that is operative to transfer register values of one or more hardware threads in the register file 86 to one or more hardware threads in the offline context cache 90, and register values of one or more hardware threads of the offline context cache 90 to one or more hardware threads in the register file 86. The thread control 84 can be a stand-alone unit or be part of the execution engine 82. The execution engine 82 can include instruction queues, instruction caches, arithmetic logic units, storage buffers and other devices typical of a processor.

The execution engine 82 executes program instructions. The cache 88 interfaces with the register file 86, such that load instructions executed by the execution engine 82 cause the transfer of data from the cache 88 to the register file 86, and store instructions executed by the execution engine 82 transfer data from the register file 86 into the cache 88. The offline context cache 90 can reuse the data paths of the cache 88, but stores register values from the register file 86 and loads register values from the offline context cache 90 to the register file 86. The offline context cache 90 can be part of the cache 88, such that a portion of the cache 88 is reserved for offline register value storage of hardware threads. The execution engine 82 can execute special thread instructions that instruct the thread control 84 to move register values associated with the hardware threads of the register file 86, and the offline context cache 90 back and forth. The execution engine 82 can inject special thread load/store instructions during the thread switch time, or during available instruction scheduling times, if the main program is not using the data paths for loads/stores into the cache 88. The execution engine 82 can inject the special thread load/stores concurrent with program execution.

Figure 6:
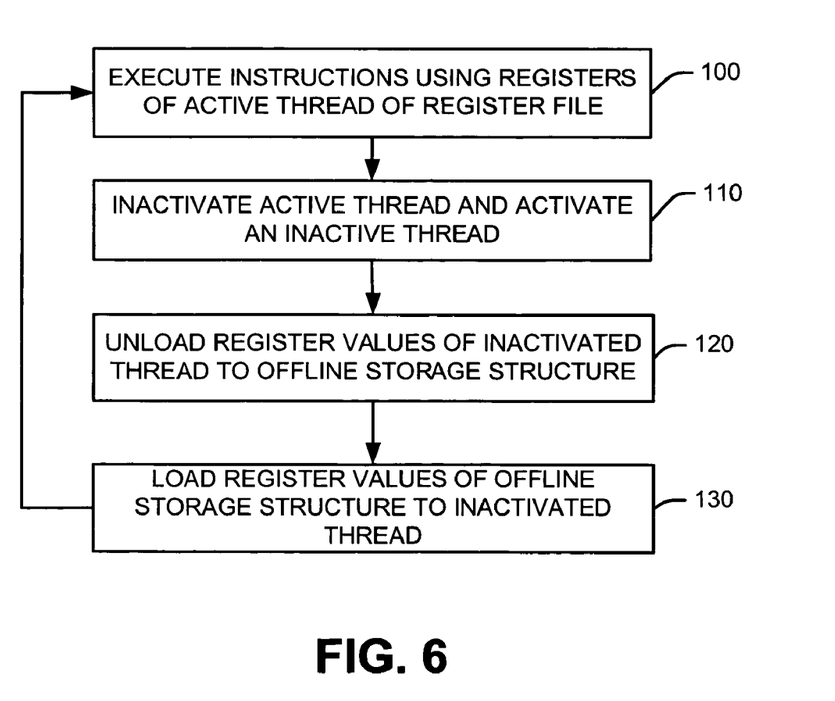
FIG. 6 illustrates an embodiment of methodology for storing architected states associated with registers of a register file.
Figure 7:
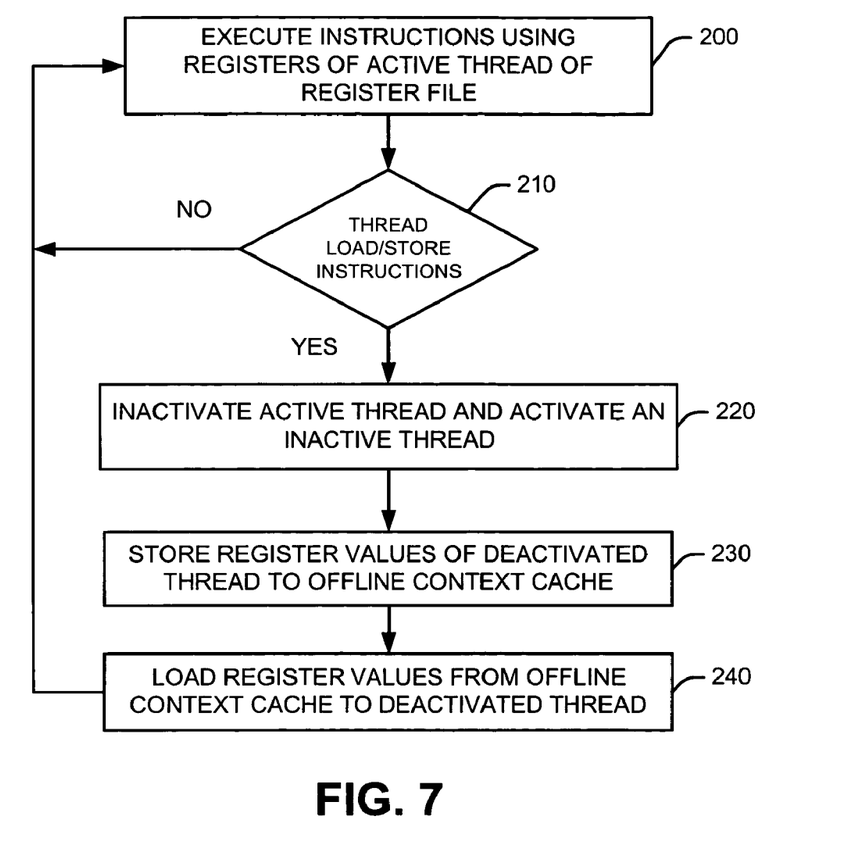
FIG. 7 illustrates an embodiment of another methodology for storing architected states associated with registers of a register file.
Figure 8:
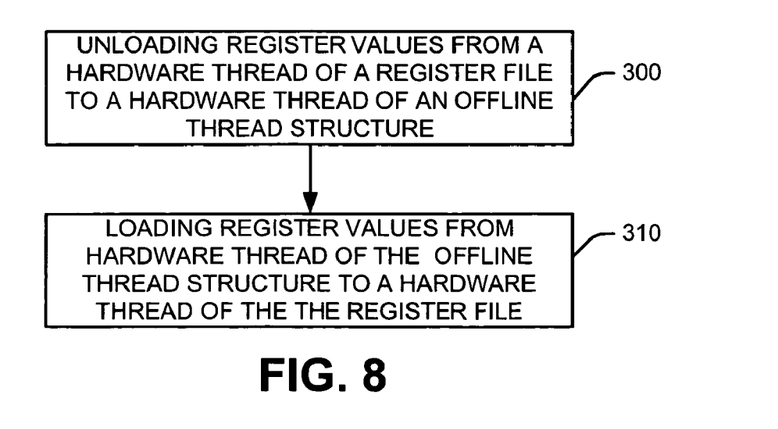
FIG. 8 illustrates an embodiment of yet another methodology for storing architected states associated with registers of a register file.

In view of the foregoing structural and functional features described above, certain methods will be better appreciated with reference to FIGS. 6-8. It is to be understood and appreciated that the illustrated actions, in other embodiments, may occur in different orders and/or concurrently with other actions. Moreover, not all illustrated features may be required to implement a method.

FIG. 6 illustrates a methodology for storing architected states associated with registers of a register file. At 100, instructions are executed, for example, by one or more execution units of a processor, using registers of an active thread of a register file. The register file can include one or more hardware threads in which only one thread can be an active thread at any given time. A hardware thread that is not an active thread is an inactive thread. The methodology then proceeds to 110. At 110, the active thread is inactivated, and an inactive thread is activated. For example, this can occur based on an instruction encountered by the processor, or as a result of request for data from another system or processor. At 120, register values of the recently inactivated thread of the register file are stored to an offline storage structure. At 130, register values are loaded into the recently inactivated thread of the register file from the offline storage structure. The offline storage structure can include a plurality of hardware threads that store architected states associated with register values of the hardware threads of the register files. The unloading of register values from the inactivated thread of the register file to the offline storage structure and the loading of register values to the inactivated thread from the offline storage structure can occur concurrently or sequentially. The methodology then returns to 100 to begin execution of instructions using registers of the active thread of the register file.

FIG. 7 illustrates another methodology for storing architected states associated with registers of a register file. At 200, instructions are executed, for example, by one or more execution units of a processor, using registers of an active thread of a register file. The register file can include one or more hardware threads in which only one thread can be an active thread at any given time. A hardware thread that is not an active thread is an inactive thread. The methodology then proceeds to 210. At 210, the method determines if special thread load/store instructions have been encountered. If the method determines that special thread load/store instructions have not been encountered (NO), the methodology returns to 200 to continue executing instructions using registers of the active thread of the register file. If the method determines that special thread load/store instructions have been encountered (YES), the methodology proceeds to 220.

At 220, the active thread is inactivated, and an inactive thread is activated. At 230, register values of the recently inactivated thread of the register file are stored to an offline context cache. At 240, register values from the offline context cache are loaded into the recently inactivated thread of the register file. The offline context cache can store a plurality of architected states associated with register values of one or more hardware threads of the register file. The methodology then returns to 200 to begin execution of instructions using registers of the active thread of the register file.

FIG. 8 illustrates yet another methodology for storing architected states associated with registers of a register file. At 300, register values from a hardware thread of a register file are unloaded to a hardware thread of an offline thread structure. At 310, register values from a hardware thread of the offline thread structure are loaded to a hardware thread of the register file.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A multithreaded processor system comprising:
a register file having N hardware threads, where N is an integer greater than one;
an offline storage structure having M hardware threads, where M is an integer greater than or equal to one; and
a thread control that inactivates a first one of the N hardware threads in the register file and activates a second one of the N hardware threads in the register file and, in response to the inactivation of the first one of the N hardware threads and the activation of the second one of the N hardware threads, unloads register values associated with a first architected state of the processor system from the inactivated thread to registers of one of the M hardware threads and loads register values from one of the M hardware threads associated with a second architected state of the processor system to the inactivated thread in the register file;
wherein the register file is arranged as columns of registers with each column having N register portions, such that each of the N register portions is associated with a different hardware thread of the register file;
wherein the offline storage structure is an offline register file arranged as columns of registers with each column having M register portions, such that each of the M register portions is associated with a different hardware thread of the offline register file; and
wherein the M register portions and the N register portions are shift registers and a given column of M register portions associated with a respective register in the offline register file is aligned with a given column of N register portions associated with a substantially similar register in the register file, such that a shift register ring is formed that allows for the shifting register values from the one of the M hardware threads in the offline register file to the first one of the N hardware threads in the register file concurrently with the shifting of register values from the first one of the N hardware threads in the register file to the one of the M hardware threads in the offline register file.

2. The system of claim 1, wherein the one of the M hardware threads in which register values are unloaded from the inactivated thread is the same as the one of the M hardware threads in which the register values are loaded to the inactivated thread.

3. The system of claim 1, wherein the one of the M hardware threads in which register values are unloaded from the inactivated thread is a transition thread and the one of the M hardware threads in which the register values are loaded to the inactivated thread is different than the transition thread.

4. The system of claim 1, further comprising an execution engine that executes instructions, the execution engine executing load and store instructions that instruct the thread control to move register values from the register file to the offline storage structure and move register values from the offline storage structure to the register file.

5. The system of claim 1, wherein N is equal to two.

6. A multithreaded register file architecture comprising:
a register file having a plurality of hardware threads and associated control logic for reading and writing of register values associated with an active hardware thread of the register file;
an offline thread structure having at least one offline hardware thread for storing register values associated with an architected state of at least one inactive hardware thread of the register file; and
a thread control that initiates the transfer of register values between at least one inactive thread of the register file and the at least one offline hardware thread of the offline thread structure by aligning one of the at least one inactive hardware thread in the register file with one of the at least one inactive hardware thread in the offline thread structure to form a shift register ring, such that register values of the one of the at least one inactive thread of the register file are transferred to the one of the at least one inactive hardware thread in the offline thread structure and register values of the one of the at least one inactive hardware thread in the offline thread structure are transferred to the one of the at least one inactive thread of the register file concurrently.

7. The architecture of claim 6, wherein the associated control logic enables the switching of a given hardware thread of the register file between an active state and an inactive state.

8. The architecture of claim 6, wherein the offline storage structure comprises an offline register file.

9. The architecture of claim 8, wherein the register file is arranged as columns of registers with each column having two register portions, such that a first register portion is associated with a first hardware thread and a second register portion is associated with a second hardware thread.

10. The architecture of claim 9, wherein the offline storage structure is an offline register file arranged as columns of registers with each column having M register portions, where M is an integer greater than or equal to one, such that each of the M register portions is associated with a different hardware thread of the offline register file, and a given column of M register portions is associated with a given column associated with a substantially similar register in the register file.

11. The architecture of claim 6, wherein the offline storage structure is an offline context cache that is one of a standalone structure and a portion of a cache structure, the thread control initiating the transfer of register values between the register file to the offline context cache based on thread load and store instructions.

12. The architecture of claim 6, wherein the thread control, in response to inactivation of the one of the at least one inactive thread of the register file, activates a second of the plurality of hardware threads in the register files and initiates the transfer of the register values between the one of the at least one inactive thread of the register file and the one of the at least on inactive hardware thread in the offline thread structure.

13. A register file system having a register file with at least one hardware threads, the system comprising:
 means for storing architected states of registers associated with at least one hardware thread of the register file offline from the register file; and
 means for controlling the transfer of register values of an architected state of a register concurrently between the register file and the means for storing architected states in response to an inactivation of a hardware thread that is associated with the architected state of the register.

14. The system of claim 13, further comprising means for instructing the means for controlling the transfer of architected states of registers.

15. The system of claim 13, wherein the means for controlling activates a second hardware thread of the register file prior to the transfer of the architected state of the register between the register file and the means for storing architected states.

16. The system of claim 13, wherein the means for transferring aligns the inactivated hardware thread of the register file and the hardware thread of the means for storing architected states to form a shift register ring for unloading the register values of the inactivated hardware thread of the register file and loading of the register values of the hardware thread of the means for storing architected states.

17. A method for storing architected states associated with registers of a register file, the method comprising:
 inactivating a first hardware thread of a register file;
 activating a second hardware thread of a register file;
 unloading register values from the first hardware thread of a register file to a hardware thread in an offline thread structure; and
 loading register values from the hardware thread in the offline thread structure to the first hardware thread of the register file;
 wherein the unloading and loading is executed concurrently.

18. The method of claim 17, wherein the unloading and loading is executed by shifting register value bits of registers of the first hardware thread of the register file into registers of the hardware thread of the offline thread structure concurrently with the shifting of register value bits of registers of the hardware thread of the offline thread structure into registers of the first hardware thread of the register file.

19. The method of claim 17, further comprising executing load and store instructions that initiate the unloading of register values to an offline context cache associated with a first architected state of the first hardware thread and the loading of register values from the offline context cache associated with a second architected state of the first hardware thread.

20. The method of claim 17, wherein the offline storage structure comprises one of an offline register file and an offline context cache.

21. A multithreaded processor system comprising:
 a register file having N hardware threads, where N is an integer greater than one;
 an offline storage structure having M hardware threads, where M is an integer greater than or equal to one; and
 a thread control that inactivates a first one of the N hardware threads in the register file and activates a second one of the N hardware threads in the register file and, in response to the inactivation of the first one of the N hardware threads and the activation of the second one of the N hardware threads, unloads register values associated with a first architected state of the processor system from the inactivated thread to registers of one of the M hardware threads and loads register values from one of the M hardware threads associated with a second architected state of the processor system to the inactivated thread in the register file;
 wherein the thread control aligns the one of the N hardware threads in the register file with the one of the M hardware threads in the offline storage structure to form a shift register ring for unloading the register values associated with the first architected state and loading of the register values associated with the second architected state concurrently.

22. The system of claim 21, wherein the one of the M hardware threads in which register values are unloaded from the inactivated thread is the same as the one of the M hardware threads in which the register values are loaded to the inactivated thread.

23. The system of claim 21, wherein the one of the M hardware threads in which register values are unloaded from the inactivated thread is a transition thread and the one of the M hardware threads in which the register values are loaded to the inactivated thread is different than the transition thread.

24. The system of claim 21, wherein the register file is arranged as columns of registers with each column having N register portions, such that each of the N register portions is associated with a different hardware thread of the register file and wherein the offline storage structure is an offline register file arranged as columns of registers with each column having M register portions, such that each of the M register portions is associated with a different hardware thread of the offline register file.

25. The system of claim 24, wherein the M register portions and the N register portions are shift registers and a given column of M register portions associated with a respective register in the offline register file is aligned with a given column of N register portions associated with a substantially similar register in the register file, such that a shift register ring is formed that allows for the shifting register values from the one of the M hardware threads in the offline register file to the first one of the N hardware threads in the register file concurrently with the shifting of register values from the first one of the N hardware threads in the register file to the one of the M hardware threads in the offline register file.

26. The system of claim 21, further comprising an execution engine that executes instructions, the execution engine executing load and store instructions that instruct the thread control to move register values from the register file to the offline storage structure and move register values from the offline storage structure to the register file.

27. The system of claim 21, wherein N is equal to two.

* * * * *